United States Patent
Zhang et al.

(10) Patent No.: US 8,868,979 B1
(45) Date of Patent: Oct. 21, 2014

(54) HOST DISASTER RECOVERY SYSTEM

(75) Inventors: Zhihe Zhang, Nanjing (CN); Zhifei Tao, Nanjing (CN); Min Zhang, Beijing (CN); Yong An, Nanjing (CN); Xiaodong Huang, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 330 days.

(21) Appl. No.: 13/301,604

(22) Filed: Nov. 21, 2011

(51) Int. Cl.
*G06F 11/00* (2006.01)

(52) U.S. Cl.
USPC .......................................................... 714/36

(58) Field of Classification Search
USPC .......................................................... 714/36
See application file for complete search history.

(56) References Cited

U.S. PATENT DOCUMENTS

| | | | | |
|---|---|---|---|---|
| 6,560,719 B1 * | 5/2003 | Pham et al. | | 714/15 |
| 6,948,099 B1 * | 9/2005 | Tallam | | 714/38.14 |
| 7,080,279 B2 * | 7/2006 | Asare et al. | | 714/13 |
| 7,489,782 B1 * | 2/2009 | DeVos | | 380/278 |
| 7,650,531 B2 * | 1/2010 | Yeung et al. | | 714/5.1 |
| 7,694,165 B2 * | 4/2010 | Sudhakar et al. | | 714/3 |
| 8,181,247 B1 * | 5/2012 | Pavlyushchik et al. | | 726/22 |
| 2004/0044890 A1 * | 3/2004 | Lim et al. | | 713/2 |
| 2004/0107199 A1 * | 6/2004 | Dalrymple et al. | | 707/100 |
| 2004/0255106 A1 * | 12/2004 | Rothman et al. | | 713/1 |
| 2005/0289382 A1 * | 12/2005 | Lee | | 714/2 |
| 2006/0179484 A1 * | 8/2006 | Scrimsher et al. | | 726/23 |
| 2006/0253724 A1 * | 11/2006 | Zhang | | 714/2 |
| 2007/0128899 A1 * | 6/2007 | Mayer | | 439/152 |
| 2012/0102359 A1 * | 4/2012 | Hooks | | 714/26 |
| 2012/0198154 A1 * | 8/2012 | Keith, Jr. | | 711/115 |

\* cited by examiner

*Primary Examiner* — Bryce Bonzo
(74) *Attorney, Agent, or Firm* — Beyer Law Group LLP (57) ABSTRACT

Critical resources are identified within a computer system such as operating system files, drivers, modules and registry keys that are used to bootstrap the computer. During a successful bootstrap, these resources are saved into persistent storage during the bootstrap phase. Changes to critical resources are monitored and these resources are backed up if they are changed. Upon computer system failure, steps of identifying the type of failure and an analysis of its root cause are optionally performed. A user is presented with a bootstrap menu and critical resources necessary to bootstrap the computer are retrieved from persistent storage and saved into their appropriate locations. A successful bootstrap is then performed of the computer system in order to recover from the failure.

17 Claims, 7 Drawing Sheets

Example Relationship Table

FIG. 3

Backup System

FIG. 4
Restore System

Please select the operating system to start:

Microsoft Windows XP Professional
    Microsoft Windows XP Professional (SOS)

Use the up and down arrow keys to move the highlight to your choice.
Press ENTER to choose.

FIG. 5
Bootstrap Menu

HOST DISASTER RECOVERY SYSTEM

FIELD OF THE INVENTION

The present invention relates generally to computer system recovery. More specifically, the present invention relates to computer system recovery in the context of anti-virus software products.

BACKGROUND OF THE INVENTION

In recent years, computer failures and even computer disasters have affected more and more user computers and corporate computers. In some cases, these failures and disasters have been caused by anti-virus software products, such as products that prevent viruses, worms, spyware, phishing, and malware in general.

For example, in 2005 a faulty pattern file of virus signatures was released that caused user computers to consume 100% of their CPU time. In 2007 an anti-virus product released by a major anti-virus service provider produced a false positive result which ended up crippling thousands of personal computers in China. In 2008 another faulty pattern file was released that mistakenly quarantined numerous critical files of an operating system causing the user computers not to boot successfully. And, in 2010 a faulty pattern file was released that deleted a critical operating system file. Releasing faulty pattern files or delivering software products that do not function correctly by an antivirus software provider is especially problematic because the software affects many thousands if not millions of user computers worldwide. Also, the resulting computer failures are generally catastrophic causing the computers, networks and systems not to function at all. Because the antivirus software providers are in a position of trust, releasing faulty software is especially troublesome.

Typically, the failure or disaster is usually caused by the release of a faulty pattern file or a faulty antivirus product update. To date, there have been attempts to solve this problem but they have so far not provided a final solution.

One technique is to quarantine a particular file instead of deleting the file permanently, thus saving the information if the deletion was unintentional. But, even if a file is quarantined rather than deleted, there is no way to access or restore the file if its host computer has failed catastrophically. Another technique is to use the Microsoft operating system "System Restore" function to recover the computer system, but there are many limitations. For example, the user must be knowledgeable about the computer, the restore point may have been set several days previously, and the entire process takes a great deal of time.

Accordingly, a system and technique are desired that would allow a host computer to recover from a failure caused by an antivirus software product that would work reliably and easily for user.

SUMMARY OF THE INVENTION

To achieve the foregoing, and in accordance with the purpose of the present invention, a host computer disaster recovery is disclosed that allows a host computer to recover from a system failure or from deletion of critical system resources.

Critical resources are identified within a computer system such as operating system files, drivers, modules and registry keys that are used to bootstrap the computer. During a successful bootstrap, these resources are saved into persistent storage during the bootstrap phase. Changes to critical resources are monitored and these resources are backed up if they are changed. Upon computer system failure, steps of identifying the type of failure and an analysis of its root cause are optionally performed. A user is presented with a bootstrap menu and critical resources necessary to bootstrap the computer are retrieved from persistent storage and saved into their appropriate locations. A successful bootstrap is then performed of the computer system in order to recover from the failure.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
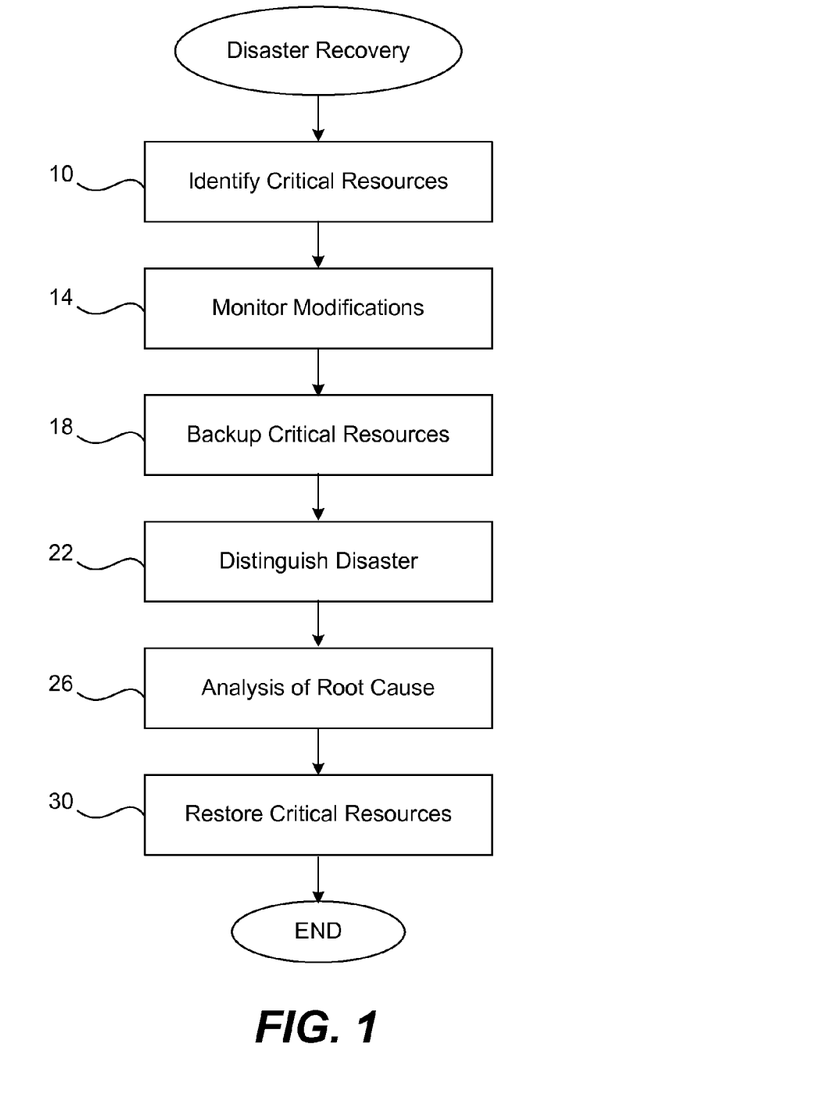
FIG. 1 is a flow diagram describing one embodiment for recovering from a computer host disaster.

FIG. 1 is a flow diagram describing one embodiment for recovering from a computer host disaster. The computer host may be any suitable computer such as a desktop computer, laptop computer, Web server, corporate computer, mainframe computer, etc. In one specific embodiment, the host computer is executing an antivirus software product that is supposed to detect, prevent and eliminate malware on the host computer. It is possible, however, that the software product might malfunction and cause the host computer to fail. The invention, however, applies to any computer, not only to computers executing antivirus software.

In a first step 10, the invention identifies critical resources of the computer system upon which it is executing. These critical resources include the operating system files, drivers, modules and registry keys that are used to boot up the computer. Preferably, only the registry keys used during the boot process are considered critical. Resources may also include other applications' configuration, such as a pattern file of anti-malware software. Also, these resources are configurable, i.e., the user can set the resources via the interface of the product.

In one embodiment, during the last successful boot of the computer these resources are recorded as a benchmark and stored in a suitable database of the computer. For example, a record is made dynamically of the boot sequence while the computer boots. This may be performed by a kernel driver that is already executing when the boot process begins and records the boot sequence; i.e., it has been loaded and executed early enough in the process. Another technique used to determine these critical resources is to use a static configuration of the computer. In some scenarios, for example in an enterprise, because the operating system and installed application are the same, the critical resources can simply be listed as a static configuration. In this situation, it is only these resources that are needed to be backed up.

Figure 2A:
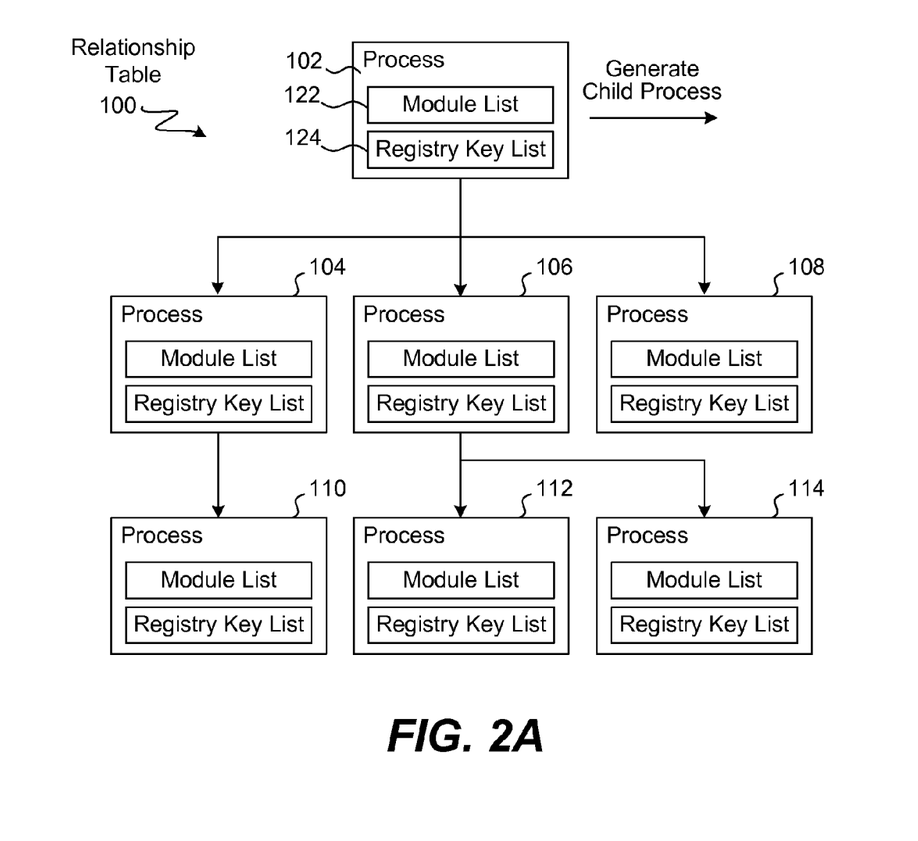
FIG. 2A is a block diagram of a relationship table into which this critical resource information may be stored on the host computer.

FIG. 2A is a block diagram of a relationship table 100 into which this critical resource information may be stored on the host computer. Shown, for example, are processes 102-114, and the parent-child relationships between these processes. For example, processes 104-108 are children of process 102 and processes 112 and 114 are children of process 106. It may also be said that process 102 has spawned processes 104-108. Each process has a module list, for example module list 122 is a list of critical files used to implement process 102 during the boot process. An example of such critical files are the DLLs and kernel drivers loaded and used during the boot process by process 102. Also, registry list 124 is a list of critical registry keys used to implement process 102. In other words, these registry keys are keys that process 102 accesses and uses during the boot process. Typically, there will be a single relationship table 100 generated and stored during the boot process. For example, process 102 may be a process such as User Initialization ("userinit") or a process such as Windows Log On ("winlogon").

Figure 2B:
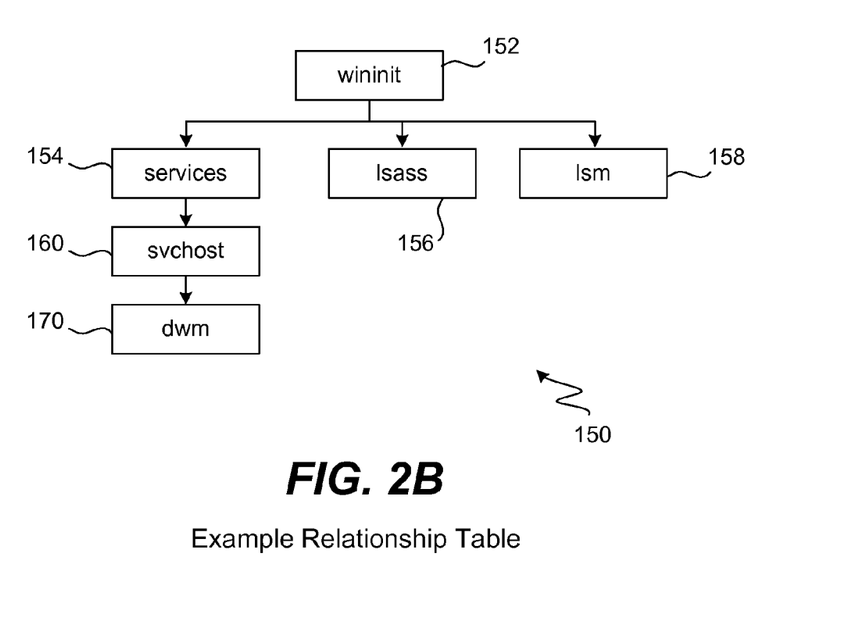
FIG. 2B is a block diagram of an exemplary relationship table.

FIG. 2B is a block diagram of an example relationship table 150 into which particular critical resource information may be stored on the host computer. The process "winit" 152 is an initial process, process 154 "services" is a child process of 152, process "Lsass" 156 is the Local Security Authority Process, process "Lsm" 158 is the Local Session Manager, process 160 "Svchost" is the Windows Service Host, and process "Dwm" is the Desktop Windows Manager. Typically, the relationship table is only used for backup. Based on the relationships shown and the data stored, we know about the critical resources of each process. If one process is critical, its parent must also be critical. By using this method and the table, fewer critical resources are missed during backup.

In step 14 the invention monitors any modifications made to these critical system resources. This is performed preferably by one or more kernel drivers that, after the boot process, monitor these critical resources (e.g., operating system files, registry keys, etc.) and determine if any are modified. A kernel driver detects whether or not a file or registry key has been modified using various techniques; it also keeps track of the original resource and also the modification. In one embodiment, a driver uses a hook technique but the invention is not so limited.

The driver hooks the file system and the configure manager (CM) using a hook function which are known in the art. Usually, the driver is a file system filter driver and a configure manager (CM) filter driver. The driver attaches to the file system and the CM, so every file or registry operation will first go through the driver. If the operation is write or delete, the driver will block the operation, backup the resource if it is critical, and then pass the operation to the file system or to the CM for handling. When there is a boot session, all critical resources modified are flagged with the session identifier. If the system fails to boot, the resources modified after the latest boot are considered to be rolled back to the last known good status.

In step 18 these critical resources are backed up. Preferably, the backup includes the registry keys and the critical files. In one embodiment, the invention monitors modifications to files and registry keys and initially blocks any attempt to write a file and modify registry entries. A routine detects that a file is about to be modified but, instead of sending the modification request to the low-level kernel driver, the routine backs up the original file to backup storage, and then allows the request to be handled normally. Preferably, this routine is a hook module but could be any type of routine. Usually, for file operations, the routine can be a file system filter driver that is attached to the file system. For registry operations, it can be a series of callback functions of the configure manager.

Modifications to registry keys are also monitored and the original values of these keys are sent to backup storage before they are modified. Modification to a registry key is detected and backed up using different techniques. In one embodiment, the driver registers a series of callback functions of the configure manager (CM). Then every registry operation will be notified by the CM before it takes effect. The driver will block the operation and back up the resource if it is critical, and then pass the operation to the CM for handling. This technique uses a hook method, but the invention is not so limited.

Figure 3:
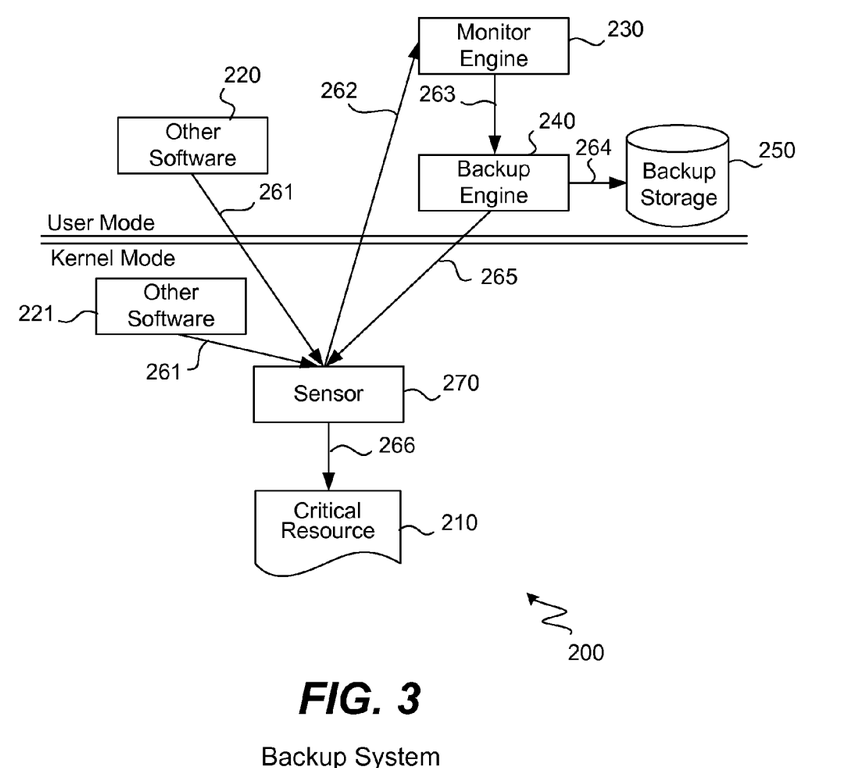
FIG. 3 illustrates an architecture for a backup system used to implement backing up resources.

FIG. 3 illustrates an architecture for a backup system 200 used to implement steps 14 and 18. Shown are critical resources 210 of the host computer (such as files and registry keys stored on disk), and other software 220 and 221 (in addition to the operating system of the computer and any antivirus software) that may also be executing upon the host computer. For example, other software 220 executing in the user mode and other software 221 executing in the kernel mode may be any type of malware or virtually any other computer program. Other software modules also included that may execute upon the host computer are a monitor engine 230 and a backup engine 240. A backup storage region 250 upon the host computer is typically located on disk and will store the relationship table and any critical resources needing to be backed up such as those that are being modified.

Also included is a sensor 270 that detects when any of the additional software 224 to 21 attempts to modify 261 any of the critical resources 210 such as a file or a registry. In one embodiment, sensor 270 is a lightweight kernel driver that detects and records any of the low-level kernel events indicating that a file or registry key might be changed. The sensor may utilize one or more hook modules in order to detect changes in input/output or registry keys. If an event is detected, the sensor (in kernel mode) blocks the operation requested by the other software and notifies 262 the monitor engine 230 of the particular event. The sensor 270 may be implemented as a driver hooked to the file system and the configure manager (CM); usually it is a file system filter driver and a series callback functions registered to the CM. Other hook methods can do the same thing, such as an inline hook. The sensor may also be implemented in the user mode, but it can be bypassed easily, so this approach is not preferred.

Monitor engine 230 is a software module on the host computer that operates to help optimize the backup process. As the sensor 270 detects a great number of low-level kernel events, and not all these events actually indicate that a file or registry key is being changed, the monitor engine uses a set of rules in order to combine sensor events in order to determine if a file or registry key is a critical resource and actually needs to be backed up. For example, an indication that a file is about to be written and needs to be backed up may be indicated by a combination of two events a "File Open" event and a "File Write" event. Various rules may be used to determine if a resource is critical and whether or not it needs to be backed up. For example, when an application modifies an existed file, it includes the following events: one "open_file" event, several "write_file" events (according to the size it modifies), and one "close_file" event. If we back up the original file when we receive the "open_file" event, the backup operation is useless if no "write_file" event follows. If we back up the original file when we receive the "write_file" event, the file may be backed up many times, and most backups are useless except the first one. So, one rule may be "back up the file when we receive the first "write_file" event after a "create_file" event," and this will ensure that the right file is backed up.

If engine 230 (in user mode) determines that a combination of events indicates that a file or registry key should be backed up then it instructs 263 backup engine 240 to backup the file or key. Backup engine 240 coordinates the backing up of the original files and keys by ensuring that the proper privileges are in place, synchronizes the necessary processes in order to copy the file, records the hash value of files and performs any necessary encoding or decoding to prevent infection by malware. Finally, engine 240 backs up any critical resources 210 into backup storage 250 (typically a file on disk).

Engine 240 will also record the bootstrap session to which the critical resource belongs, and then will add a bootstrap menu to the system. For example, a bootstrap menu shown in FIG. 5 may be added to the system. Usually, the disaster is discovered by the user, and then he or she can choose the added menu to recover the system. The bootstrap session is important for various reasons. For one, the processes may have relationships between themselves. If resources modified in different sessions are restored, the relationships may be broken, and some processes may crash. When the user chooses the recover menu, the recovery engine restores the resources modified from the last boot session. Thus, the system reverts to the last known-good session. The boot menu typically would be used by the user when he or she founds that he or she cannot boot or logon the system.

Finally, backup engine 240, after backing up the critical resources, notifies the sensor via 265 to release the previously blocked operation from the other software. Next, other software 220 or 221 proceeds to modify the resource it had previously attempted to modify. At this point, critical resources of the computer system have been backed up and may continue to be backed up as critical resources are changed. Once critical resources are backed up, the computer system is ready to recover from any type of system failure or disaster that may occur.

Figure 4:
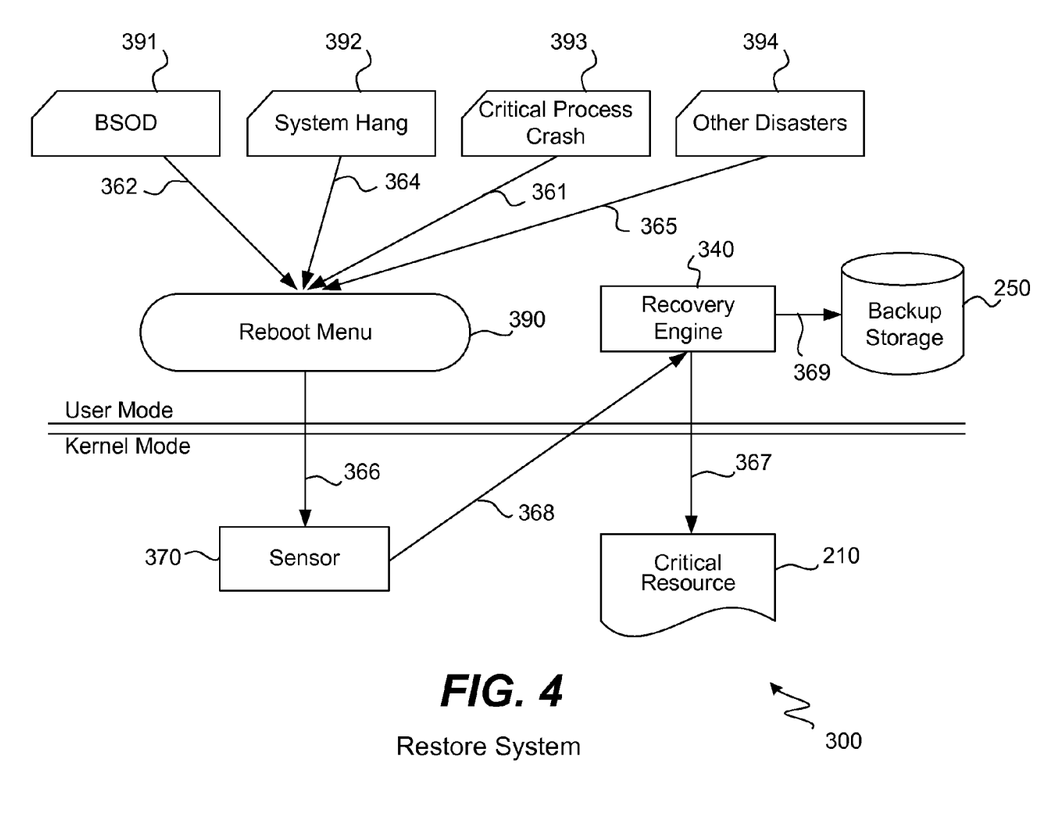
FIG. 4 is a block diagram of a recovery system showing one embodiment by which recovery is performed on the host computer.

FIG. 4 is a block diagram of a restore system 300 showing one embodiment by which recovery is performed on the host computer. Shown are possible types of computer failures and disasters 391-394, a reboot menu 390, a recovery engine software module 340 and backup storage 250. In the kernel mode is sensor 370 (previously described) and any number of critical resources 210. This restore system 300 will be used to restore the critical resources of the computer system in the event of one of the above failures.

Assuming that a computer failure occurs, in step 22 the process distinguishes which type of failure or disaster has occurred within the host computer. This step is optional. The process continuously monitors all operating system errors. Examples of possible system errors are the operating system hanging, the so-called "blue screen of death" or BSOD, a forced restart, a kernel crash, a critical process crash or other disasters. When such a failure occurs this step will collect relevant operating system information such as: contents of the stack, contents of the heap, PEB (Pxxx Environment Block), TEB (Thread Environment Block), and so on. Once finished, this step triggers an analysis module which is the next step.

Another possible failure is that the computer will not boot up properly and hence the operating system never begins to execute normally. In this situation, is still possible for the user to manually enter into a recovery mode because the critical resources have been previously stored during a prior successful bootstrap process. The user may then manually select to enter the recovery mode by choosing the boot menu added by the backup engine. When the machine boots, the boot manager shows one new boot menu beside the old menu, such as "Microsoft Windows XP Professional (SOS)", shown in FIG. 5. When the user chooses this item, the recovery mode is entered.

Figure 5:
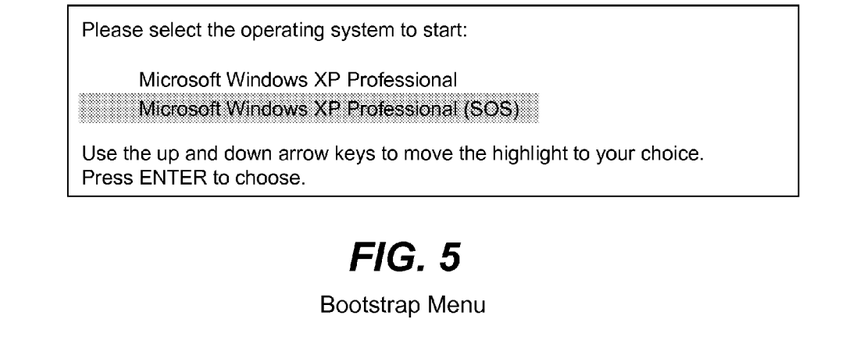
FIG. 5 illustrates one example of a bootstrap menu.

Alternatively, in step 22 the user manually enters the recovery mode by choosing 361-365 a selection from the recovery bootstrap menu shown in FIG. 5. The user may wish to enter the recovery mode even if there has not been a complete failure computer, for example if a single file has been lost and the user wishes to recover that file. Sensor 370 monitors 366 which recovery bootstrap selection has been chosen by the user from the reboot menu 390 that had been added previously. The operating system stores the boot menu in its local storage (for example, before Microsoft Vista, it is stored in "boot.ini;" and after Microsoft Vista, it is stored in Boot Manager). The operating system will show the menu during the start up, then the user can choose a selection to enter the operating system. If the user does not choose a selection, the operating system will use the default when the menu times out (usually, set to 30 seconds, it can be set when the backup engine adds the new boot menu).

Next, in step 26 an analysis is performed to identify the root cause of the failure. This is an optional step and may be performed in different ways. If not performed, the invention is still able to restore critical system resources. For example, should the failure be identified as the operating system hanging, then this analysis enumerates the following in order to determine the root cause: read/write locks, CRITICAL_SECTION, DPCs and APCs, and any circular waiting threads. If the failure is identified as the "blue screen of death," this analysis first walks the call stack in order to find the first module in the stack that is not signed. If the failure is identified as a forced restart, then the analysis looks for the root cause in the registry; typically this root cause will be recorded by the operating system in the registry. Failures identified as a kernel crash, as a critical process crash, or other may also be analyzed to determine the root cause.

Next, in step 30 the critical system resources are restored. In one embodiment, the analysis report will contain all the resources that have caused the host computer to fail. The recovery engine 340 is used to restore these critical resources. First, sensor 370 notifies 368 the recovery engine 340 to perform the recovery. It is not strictly necessary that all of the critical resources identified in step 10 be restored. Only the resources modified after the last boot session are needed to be restored. Preferably, all resources modified in the last boot session are restored. The system is then restored to the last know-good state.

Preferably, the recovery engine fetches 369 the original critical resources that were modified in the last known good bootstrap session. The recovery engine will restore 367 the necessary critical resources and then will reboot the operating system. These critical resources may be restored as per the following example. For a file, it is copied from the backup storage to its current location; for a registry key, we call a low-level registry API to set the current key and value according to its original in backup storage. For example, when a system critical file "userinit.exe" is infected by a malware, the invention will backup the original file "userinit.exe." When the user reboots the system, and the boot fails, the user will choose "restore" from the boot menu. Accordingly, the invention finds that the file "userinit.exe" has been modified after the last known good reboot, so it replaces the current file "userinit.exe" with the original "userinit.exe" file from backup.

Because the size of all critical resources is quite large (on the order of several GB), it may not be possible to back up all of the critical resources during the last known good session.

Therefore, not all of the critical resources are backed up, only those modified after the last known good session. Preferably, the sensor starts up as early as possible during a boot session to record changes before any operating system crash.

Computer System Embodiment

Figure 6A:
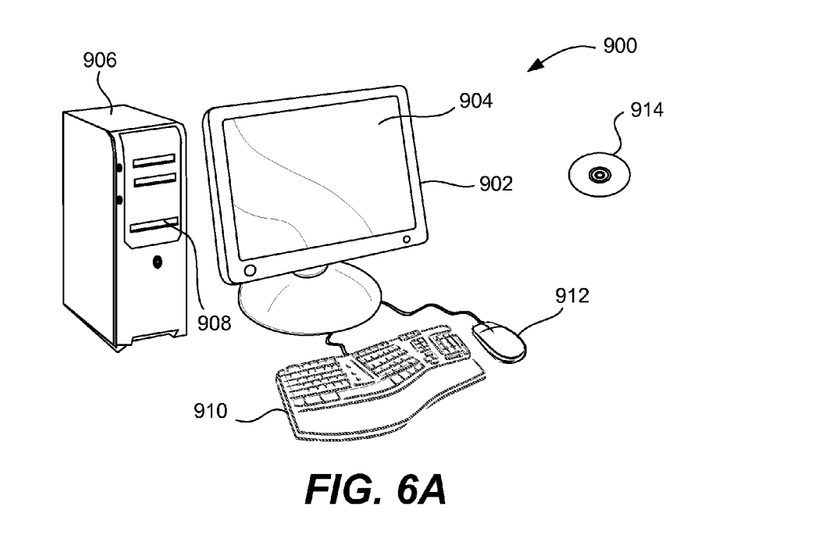
FIGS. 6A and 6B illustrate a computer system suitable for implementing embodiments of the present invention.
Figure 6B:
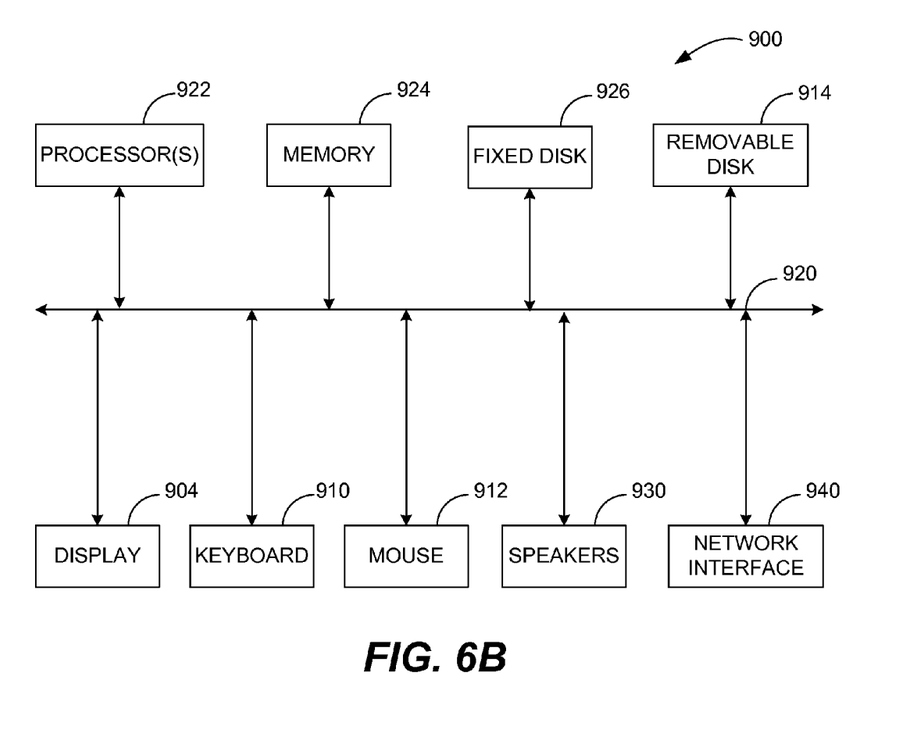

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. A method of backing up resources within a computer system, said method comprising:
   identifying critical resources within a computer system including system files and registry keys that are used to successfully bootstrap said computer system, the identifying occurring during a successful bootstrapping of said computer system;
   storing a list of said identified critical resources within a database of said computer system;
   after bootstrapping said computer system, monitoring attempts to modify a subset of said critical resources that trigger events;
   combining said events in order to determine that said subset should be backed up;
   blocking said attempts to modify said subset;
   backing up onto persistent storage of said computer system only said subset of critical resources before said subset is modified, wherein not all of said critical resources are backed up; and
   allowing said attempts to modify said subset to proceed.

2. The method as recited in claim 1 further comprising:
   monitoring said attempts using a module in the kernel mode of said computer system.

3. The method as recited in claim 1 further comprising:
   storing said list of identified critical resources during a bootstrap phase of said computer system.

4. The method as recited in claim 1 further comprising:
   combining said events using rules to determine whether or not said subset should be backed up.

5. The method as recited in claim 1 further comprising:
   adding a bootstrap menu to said computer system, whereby a user may reboot said computer system after a failure using said bootstrap menu.

6. The method as recited in claim 1 wherein said database is in persistent storage of said computer system.

7. A method of restoring resources within a computer system, said method comprising:
   executing said computer system after a first bootstrap phase including identifying critical resources within the computer system including system files and registry keys that are used to successfully bootstrap said computer system, the identifying occurring during the first boot strap phase;
   identifying a type of failure of said computer system;
   presenting a bootstrap menu to a user of said computer system;
   recovering from persistent backup storage of said computer system only those critical resources modified after said first bootstrap phase modified after the last successful bootstrap session that caused the computer system to fail, said only those critical resources being needed to perform a second bootstrap phase of said computer system, wherein said only those critical resources being original versions of resources used during a previous successful bootstrap phase of said computer system, and wherein not all critical resources used to successfully bootstrap said computer system previously are recovered;

restoring said recovered critical resources into their appropriate locations within said computer system by overwriting modified critical resources in said computer system, each of said recovered critical resource being different from said corresponding modified critical resource; and performing successfully said second bootstrap phase of said computer system in order to execute said computer system.

8. The method as recited in claim 7 wherein said critical resources include system files and registry keys.

9. The method as recited in claim 7 further comprising:
identifying the type of said failure said computer system; and
performing a root cause analysis of said failure of said computer system based upon said type.

10. The method as recited in claim 7 further comprising:
receiving a selection from a user indicating a choice on said bootstrap menu identifying how said computer system should be bootstrapped.

11. The method as recited in claim 10 further comprising:
receiving said user selection at a sensor module in said kernel mode of said computer system; and
directing, by said sensor module, that said computer system be bootstrapped using said choice.

12. A method of backing up resources within a computer system, said method comprising:
identifying critical resources within a computer system including system files and registry keys that are used to successfully bootstrap said computer system;
storing a list of said identified critical resources within a database of said computer system, said storing of said identified critical resources occurring during a successful bootstrap phase of said computer system;
backing up onto persistent storage of said computer system a subset of critical resources before any of said critical resources in said subset is modified, wherein not all of said critical resources are backed up;
identifying a failure of said computer system;
presenting a bootstrap menu to a user of said computer system;
recovering from said persistent storage of said computer system said subset of critical resources needed to perform a bootstrap phase of said computer, wherein not all critical resources used to successfully bootstrap said computer system are recovered; and
performing successfully said bootstrap phase of said computer system in order to execute said computer system.

13. The method as recited in claim 12 further comprising:
identifying said critical resources during a successful bootstrap phase of said computer system.

14. The method as recited in claim 12 further comprising:
performing said steps of identifying a failure, presenting, and recovering while said computer system has failed and is not executing normally.

15. The method as recited in claim 12 further comprising:
identifying the type of said failure said computer system; and
performing a root cause analysis of said failure of said computer system based upon said type.

16. The method as recited in claim 12 further comprising:
overwriting modified critical resources in said computer system with said recovered critical resources, said recovered critical resources being different from said modified critical resources.

17. The method as recited in claim 12 wherein said subset of critical resources being original versions of resources used during a previous successful bootstrap phase of said computer system, said method further comprising:
storing said recovered critical resources into their appropriate locations within said computer system and overwriting modified critical resources in said computer system, each of said recovered critical resource being different from said corresponding modified critical resource.

* * * * *